United States Patent
Hartmann et al.

(10) Patent No.: US 10,035,657 B2
(45) Date of Patent: Jul. 31, 2018

(54) METHOD AND DEVICE FOR CONVEYING PIECE GOODS FROM A STACK OR PILE

(71) Applicants: Bernd Hartmann, Grafschaft-Leimersdorf (DE); Wolfram Grafe, Elmenhorst (DE)

(72) Inventors: Bernd Hartmann, Grafschaft-Leimersdorf (DE); Wolfram Grafe, Elmenhorst (DE)

(73) Assignee: Deutsche Post AG, Bonn (DE)

( * ) Notice: Subject to any disclaimer, the term of this patent is extended or adjusted under 35 U.S.C. 154(b) by 0 days.

(21) Appl. No.: 15/279,712

(22) Filed: Sep. 29, 2016

(65) Prior Publication Data
US 2017/0096301 A1 Apr. 6, 2017

(30) Foreign Application Priority Data
Oct. 1, 2015 (DE) .......................... 10 2015 116 720

(51) Int. Cl.
*B65G 21/14* (2006.01)
*B65G 59/02* (2006.01)
(Continued)

(52) U.S. Cl.
CPC ............. *B65G 21/10* (2013.01); *B65G 15/00* (2013.01); *B65G 21/12* (2013.01); *B65G 21/14* (2013.01);
(Continued)

(58) Field of Classification Search
CPC ................................ B65G 59/02; B65G 21/14
(Continued)

(56) References Cited

U.S. PATENT DOCUMENTS 5,256,021 A * 10/1993 Wolf ...................... B65G 67/08
198/308.1
5,351,809 A * 10/1994 Gilmore ................. B65G 21/14
198/594
(Continued)

FOREIGN PATENT DOCUMENTS

AT            401 633 B      10/1996
DE         38 17 013 A1   11/1989
(Continued)

OTHER PUBLICATIONS

Johann Wolfgang Von Goethe, "Bionics in Progress ist ein Lehrprojekt für das WS 06/07 und SS 07 für Studenten im Hauptstudium aus", Article, Dec. 31, 2007, 9 pages.

*Primary Examiner* — Douglas A Hess
(74) *Attorney, Agent, or Firm* — Reinhart Boerner Van Deuren P.C.

(57) ABSTRACT

A method for conveying piece goods from a stack, using a finger unit with two flexible flank elements which extend jointly from one end of the finger unit, wherein the two flexible flank elements are in each case flexibly connected to one another by way of a multiplicity of webs such that the finger unit is adjustable from a curved position into a straightened position and back, wherein the finger unit is pressed against the stack in a gripping direction such that one flank element is impressed by one item of piece goods, wherein the finger unit is adjusted from a straightened position into a curved position and, in the process, the finger unit grips the item of piece goods, and wherein the gripped item of piece goods is moved by the finger unit from the stack in a transport direction perpendicular to the gripping direction.

32 Claims, 12 Drawing Sheets

(51) Int. Cl.
*B65G 21/10* (2006.01)
*B65G 67/24* (2006.01)
*B65G 15/00* (2006.01)
*B65G 21/12* (2006.01)

(52) U.S. Cl.
CPC .............. *B65G 59/02* (2013.01); *B65G 67/24* (2013.01); *B65G 2207/08* (2013.01)

(58) Field of Classification Search
USPC ........ 198/572, 617, 812; 414/393, 395, 402, 414/572, 788.8, 789.5, 796.5, 797.2
See application file for complete search history.

(56) References Cited

U.S. PATENT DOCUMENTS

| | | | | |
|---|---|---|---|---|
| 5,685,416 | A * | 11/1997 | Bonnet | B65G 21/14 198/812 |
| 5,924,839 | A * | 7/1999 | Dopke | B65G 59/02 414/796 |
| 6,484,862 | B1 * | 11/2002 | Gilmore | B65G 21/14 193/35 TE |
| 8,651,794 | B2 * | 2/2014 | Pippin | B65G 67/24 198/308.1 |
| 8,834,336 | B2 * | 9/2014 | Grill | B65H 45/1015 493/359 |
| 9,290,354 | B2 * | 3/2016 | Grill | B65H 33/02 |
| 9,321,601 | B2 * | 4/2016 | Pippin | B65G 67/08 |
| 9,738,466 | B2 * | 8/2017 | Pippin | B65G 67/24 |
| 9,776,801 | B2 * | 10/2017 | Hartmann | B65G 21/14 |
| 2001/0009217 | A1 | 7/2001 | Gilmore et al. | |
| 2013/0230373 | A1 | 9/2013 | Pippin | |
| 2014/0341694 | A1 | 11/2014 | Girtman et al. | |

FOREIGN PATENT DOCUMENTS

| | | |
|---|---|---|
| DE | 10 2005 010 380 A1 | 9/2006 |
| DE | 10 2007 017 416 B3 | 6/2008 |
| DE | 10 2011 115 951 A1 | 4/2013 |
| EP | 2 241 403 A1 | 10/2010 |
| WO | WO 2010/108662 A1 | 9/2010 |

* cited by examiner

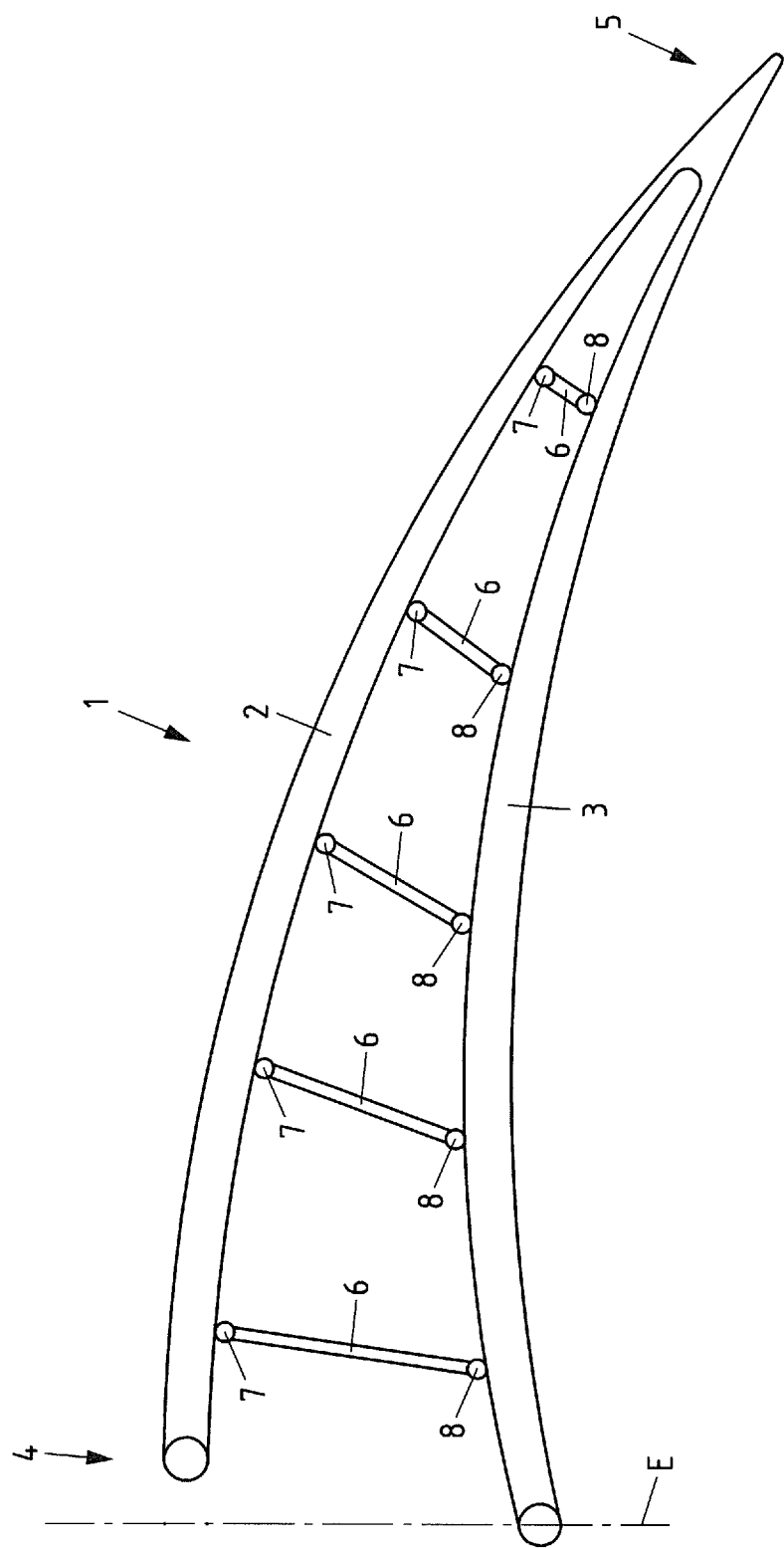

METHOD AND DEVICE FOR CONVEYING PIECE GOODS FROM A STACK OR PILE

CROSS-REFERENCE TO RELATED PATENT APPLICATIONS

This patent application claims priority to German Application No. 10 2015 116 720.4, filed Oct. 1, 2015, the entire teachings and disclosure of which are incorporated herein by reference thereto.

FIELD

The invention relates to a method for conveying piece goods, in particular packages, from a stack and/or pile of piece goods. The invention also relates to a belt-type conveyor device, preferably a telescopic belt-type conveyor, for conveying piece goods, in particular packages, having a conveyor belt which circulates around a supporting structure.

BACKGROUND

Various methods for conveying piece goods, in particular packages, and belt-type conveyor devices used for this purpose are already known. These are used for example in order to unload stacked or piled-up piece goods from a loading space, in particular of a heavy goods vehicle, semitrailer, trailer, container, transport container, interchangeable container and/or rolling container. The piece goods, which may be packages, are in this case firstly brought down from the stack or pile and thereafter transported onward, for example in order to be supplied for sorting, temporary storage or other processing.

The conveying of piece goods that have been brought together to form a stack or a pile is not always possible without problems, in particular in the case of piece goods that are easily damaged. Therefore, in practice, it is not always possible for piece goods to be moved away from stacks or piles in a satisfactory manner, such that there is a demand for optimization with regard to the corresponding handling of piece goods.

SUMMARY OF SOME EXEMPLARY EMBODIMENTS OF THE INVENTION

The present invention is based on the object of configuring and further developing the methods and the belt-type conveyor device in each case of the type mentioned in the introduction and described in more detail above such that satisfactory handling of piece goods can be realized.

Said object is achieved according to embodiments of the method disclosed herein for conveying piece goods, in particular packages, from a stack and/or pile of piece goods, using a finger unit comprising at least two flexible flank elements which extend jointly from one end of the finger unit to an opposite end of the finger unit, wherein the at least two flexible flank elements are, between the two ends of the finger unit, in each case flexibly connected to one another by way of a multiplicity of webs such that the finger unit is adjustable at least from a curved position into a straightened position and back,
  wherein the finger unit is pressed against the stack and/or pile of piece goods in a gripping direction such that the at least one flank element is partially impressed by at least one item of piece goods,
  wherein the finger unit is, as a result of the at least one flank element being impressed in sections, adjusted from a straightened position into a curved position and, in the process, the finger unit, preferably the at least one flank element, at least partially grips the at least one item of piece goods, and
  wherein the at least one at least partially gripped item of piece goods is moved by the finger unit from the stack and/or pile at least partially in a transport direction pointing perpendicular to the gripping direction.

Furthermore, the above-stated object is achieved according to embodiments of the invented method disclosed herein for conveying piece goods, in particular packages, from a stack and/or pile of piece goods, using a belt-type conveyor device, preferably telescopic belt-type conveyor, for conveying piece goods, in particular packages, having a conveyor belt which circulates around a supporting structure, wherein the supporting structure has at least one finger unit which supports the conveyor belt at least in an operating situation, wherein the finger unit has at least two flexible flank elements which extend jointly from one end of the finger unit to an opposite end of the finger unit, wherein the at least two flexible flank elements are, between the two ends of the finger unit, in each case flexibly connected to one another by way of a multiplicity of webs, such that the finger unit is adjustable from a curved position into a straightened position and back, wherein the finger unit is provided at a free end of the belt-type conveyor, and wherein at least that end of the at least one finger unit which is assigned to the free end of the belt-type conveyor has a deflection, in particular deflection roller, for deflecting the conveyor belt,
  wherein the belt-type conveyor device is positioned laterally adjacent to the stack and/or pile of piece goods,
  wherein piece goods lying on the stack and/or pile are moved from the stack and/or pile onto the conveyor belt of the belt-type conveyor device, and
  wherein, during the movement of the piece goods from the stack and/or pile, the finger unit is adjusted upward and downward between at least one curved position and one straightened position for the purposes of adjusting the free end of the belt-type conveyor device.

Furthermore, the above-stated object is achieved, in the case of embodiments of a belt-type conveyor device disclosed herein, in that the supporting structure has at least one finger unit which supports the conveyor belt at least in an operating situation, in that the finger unit has at least two flexible flank elements which extend jointly from one end of the finger unit to an opposite end of the finger unit, and in that the at least two flexible flank elements are, between the two ends of the finger unit, in each case flexibly connected to one another by way of a multiplicity of webs, such that the finger unit is adjustable at least from a curved position into a straightened position and back.

The invention has recognized that, in order to improve the handling of a stack and/or a pile of piece goods, use may expediently be made of a finger unit which exhibits the so-called fin-ray effect. Here, a stack is to be understood to mean a multiplicity of piece goods arranged one on top of the other and adjacent to one another in an at least substantially regular pattern, whereas a pile is to be understood to mean an at least substantially unorganized accumulation of piece goods provided on top of and adjacent to one another. It may be the case that an accumulation of piece goods has both stack-like sections and pile-like sections, as a result of which the accumulation can be of both partially stack-like and partially pile-like form.

The so-called fin-ray effect can be observed in the tailfins of bony fish. If one presses one's finger against the side thereof, the fins curve not away but bend partially toward the finger. This is possible by way of a special construction of the fins. This is reproduced in the case of the finger unit of the invention.

Specifically, the finger unit has at least two flexible flank elements which extend jointly from one end of the finger unit to an opposite end of the finger unit. The flexibility may for example be provided by way of elastic flank elements or by way of a link chain composed of rigid chain links which are connected pivotably or articulatedly to one another. Here, corresponding flexibility is required only in one space direction. Flexibility is not imperatively required in the space directions perpendicular thereto.

Therefore, the flank elements can also easily be provided, for example, in strip-like form. A bar-like design of the flank elements is however alternatively also possible. The corresponding flexibility of the flank elements ultimately permits a curvature of the finger unit from a straightened position into a curved position, for example similarly to the curvature of a finger.

In order that the curvature of the finger unit in one direction can be triggered for example by way of a pressure exerted on the finger unit, in particular on a flank element, in the opposite direction, the at least two flank elements are, between the two ends of the finger unit, in each case flexibly connected to one another by way of a multiplicity of webs. Here, the webs may be of rigid form and may be pivotably or articulatedly connected to the flank elements. It is however optionally also possible for flexible, in particular elastic webs to be used as an alternative to pivotable or articulated connections to the at least two flank elements. In this way, it is achieved that the webs can pivot relative to the at least two flank elements in order to thereby permit a curvature of the finger unit from a straightened position into a curved position and back.

A straightened position of the finger unit can be understood to mean a maximally straightened and/or elongate orientation of the finger unit. It may however also be a position from which the finger unit can, by way of further curvature, be adjusted into a position which is more curved than the straightened position. Accordingly, the curved position also need not be a maximally curved position. The expressions "straightened position" and "curved position" can thus optionally be understood merely in relative terms, that is to say as relative positions with respect to one another. Furthermore, it should be taken into consideration that the finger unit can be adjusted from a straightened position into different curved positions in opposite directions.

Owing to the corresponding construction, the finger unit ultimately permits an adaptation of the shape to the shape of the piece goods to be transported when the finger unit presses against the piece goods or vice versa. In this way, it is firstly possible to provide a relatively large contact surface of finger unit and item of piece goods, which improves the handling of the item of piece goods. Furthermore, the contact pressure between finger unit and item of piece goods can be lowered, which promotes damage-free handling of piece goods.

The construction of the finger unit however also optionally permits the setting of a prior curvature without the presence of contact between the finger unit and the at least one item of piece goods. For this purpose, it is for example possible for the flank elements to be adjusted relative to one another in the longitudinal direction of the finger unit. Here, the finger unit then curves away from the flank element, which is adjusted further, in relation to the at least one further flank element, in the longitudinal direction toward the opposite end of the finger unit.

In order to make it possible for example for the finger unit to be adjusted not only in one plane, the finger unit may for example also have three or more flank elements which are connected to one another by way of webs. In this case, the webs may for example be of cross-shaped, star-shaped, rectangular, square, oval or circular form in order that they can be easily fixed to all flank elements. The corresponding connections are in this case preferably of either pivotable or rotatable form, and/or the webs are of flexible form.

Packages are to be understood to mean a particular type of piece goods. Packages are goods packaged in packagings. Packages may therefore have at least one outer packaging and may be provided for example as packets, boxes or containers.

According to an embodiment of the method disclosed herein, the above-described finger unit may be utilized for bringing piece goods, in particular packages, down from a stack and/or pile of piece goods. Here, the at least one finger unit is pressed against the stack and/or pile of piece goods, in particular against at least one item of piece goods situated on the top of the stack and/or pile. For this purpose, the finger unit is at least partially moved in a direction which can be referred to as gripping direction. The at least one item of piece goods then presses against the finger unit, in particular against at least one flank element. The pressure on the finger unit is in this case so great that the finger unit, in particular the at least one flank element, is locally impressed. Here, it is for example the case that the at least one flank element is moved in sections against struts and/or in the direction of at least one further flank element. As a result, and owing to the fin-ray effect of the finger unit, at least one flank element is adjusted from a straightened position into a curved position. This means for example that a part of the corresponding flank element is bent in the direction of the at least one item of piece goods.

The at least one item of piece goods is thus at least partially gripped by the finger unit, in particular by at least one flank element, as a result of the impressing of the finger unit. Said gripping action can now, as required, effect a form fit between the finger element and the at least one item of piece goods in at least one direction. At any rate, the at least one at least partially gripped item of piece goods can be moved by the finger unit in a transport direction which has at least one movement component perpendicular to the gripping direction. In this way, the at least one item of piece goods is moved from the stack and/or pile. The gripping direction is in this case, for the sake of simplicity, preferably oriented at least substantially vertically, whereas the transport direction is oriented at least substantially horizontally.

By way of the auto-adaptive characteristic of the finger unit, which has the effect that piece goods of very different shape are at least partially gripped, it is always possible for a very large contact area between the finger unit and the piece goods to be realized, such that the area-specific pressing pressure, or the contact pressure, can be kept low in order that the piece goods are not damaged during the handling process. Alternatively or in addition, a form fit can be realized in at least a direction which facilitates the conveying of the piece goods from the stack and/or from the pile. In both cases, there is in each case no need for targeted adaptation to the piece goods to be conveyed. Ultimately, the corresponding handling of the piece goods is made, for example, more reliable, less damaging and more precise.

In a first particularly preferred refinement of the method, the above-described method steps are performed multiple times or even a multiplicity of times in succession, whereby the stack and/or the pile can be gradually cleared away for example by repeated removal of piece goods. After the movement of the at least one at least partially gripped item of piece goods from the stack and/or pile, the finger unit is for example pressed again against at least one further item of piece goods of the stack and/or pile, whereby the at least one further item of piece goods is at least partially gripped by the finger element. Subsequently, the at least one further item of piece goods is also moved in the transport direction from the stack and/or pile by the finger unit. It is thus possible for the stack and/or pile to be, at least for the most part, cleared away by way of a similar sequence of similar method steps.

The at least one item of piece goods gripped by the finger unit may be removed in the transport direction from the stack and/or pile at least partially by way of a movement of the finger unit. This is expedient in particular if a form fit exists between the finger unit and the at least one gripped item of piece goods in the transport direction. The handling of the piece goods is thus possible in a simple and reliable manner. Here, the removal of the at least one item of piece goods from the stack and/or pile may also be at least partially based on some other principle.

For example, the at least one at least partially gripped item of piece goods may be moved in the transport direction from the stack and/or pile at least partially by way of a movement of a conveyor belt which is provided between the finger unit and the at least one partially gripped item of piece goods. Here, the pressing of the finger unit against the at least one item of piece goods of the stack and/or pile of piece goods causes frictional engagement to be generated. At the same time, owing to the auto-adaptive gripping of the at least one item of piece goods by the finger unit, a large connecting area is provided between the conveyor belt, which extends at least partially along the finger element or even circulates around the finger element, and the at least one item of piece goods. Both of these promote the transport of the at least one item of piece goods by way of a movement, in the transport direction, of the conveyor belt between the finger device and the at least one item of piece goods. The transport of piece goods by way of a conveyor belt is easy to realize in terms of construction, and is reliable.

Here, it is particularly preferable if at least one belt-type conveyor device according to embodiments disclosed herein is used for the removal of the at least one item of piece goods. Said belt-type conveyor device may then comprise the at least one finger unit and the conveyor belt which runs at least partially along the finger unit. With regard to the corresponding features and the resulting advantages, reference is, in order to avoid unnecessary repetition and for the sake of improved comprehensibility, made to the detailed discussion of the corresponding features given below.

Alternatively or in addition to the described principles, the at least one at least partially gripped item of piece goods may also be moved in the transport direction from the stack and/or pile at least partially by way of a movement of some other transport means provided between the finger unit and the at least one partially gripped item of piece goods. Here, as transport means, use is made in particular of rollers which can be driven by way of a corresponding drive. It is however also correspondingly possible for rigid and stable small hairs, for example on the at least one flank element, to be provided which are adjustable in terms of their orientation relative to the flank element, for example by way of a piezo effect.

The at least one finger unit may provide not only for auto-adaptive partial gripping of piece goods but also for an automatic release of the piece goods after the movement of the piece goods from the stack and/or pile. In other words, the at least one item of piece goods at least partially gripped by the finger unit can, after the movement from the stack and/or pile, be released from the finger unit in the direction of gravitational force by way of an adjustment of the finger unit from a curved position into a straightened position. In other words, after the at least one item of piece goods has been removed from the stack and/or pile, the finger unit can be adjusted from a curved position into a less curved or straightened position and can release the at least one item of piece goods. If there is no longer a counterbearing available for the at least one item of piece goods, the finger unit is no longer partially impressed by the item of piece goods. Without partial impressing of the finger unit, the finger unit no longer curves, or at any rate curves less in the direction of the item of piece goods, which is consequently released.

For suitable handling of piece goods, it is expedient if the finger unit firstly, that is to say before the finger unit presses in particular from above against the stack and/or pile of piece goods, is moved over at least parts of the stack and/or pile of piece goods. Then, at least one item of piece goods lying on top of the stack and/or the pile can be placed in contact with the finger device. Here, it is particularly expedient, specifically in particular if multiple piece goods are to be removed from the stack and/or pile in succession, if the finger unit, before making contact with at least one item of piece goods, is moved over the stack and/or pile in an approach direction at least partially opposed to the transport direction. If the finger device can be moved in the approach direction over a large distance, it is possible for even very wide or very deep stacks and/or piles to be cleared away. This is advantageous in particular during the unloading of piece goods from a heavy goods vehicle, trailer, semitrailer and/or container, because these often have a very long loading space.

Alternatively or in addition, the handling of the piece goods can be improved if a belt-type conveyor device is positioned laterally adjacent to the stack and/or pile. This may be realized such that the at least one item of piece goods moved in the transport direction from the stack and/or pile by the finger unit falls, slides and/or is moved on to a conveyor belt of the belt-type conveyor device. The at least one item of piece goods is thus collected by the belt-type conveyor device and transported away from the stack and/or pile on the conveyor belt of the belt-type conveyor device. In this way, the clearing-away of a stack and/or pile of piece goods can be carried out easily, quickly and reliably.

Here, it may be particularly expedient if, as a belt-type device to be positioned laterally adjacent to the stack and/or the pile, use is made of a telescopic belt-type conveyor and/or a belt-type conveyor device according to the embodiments disclosed herein. Owing to the telescopic nature, the belt-type conveyor device can be easily readjusted as the stack and/or pile of piece goods is gradually cleared away. Against this background, the expression "laterally" may also be understood to mean in front of the stack and/or the pile as viewed from the belt-type conveyor device. If a belt-type conveyor device according to the embodiments disclosed herein, it is again possible to utilize the auto-adaptive characteristic of the finger unit. When an item of piece goods lies on the conveyor belt and the conveyor belt lies at least partially on the finger unit, the shape of the finger unit adapts as required to the shape of the item of piece goods, which can increase the contact area on the conveyor belt and improve the transportation along the belt-type conveyor device. Alternatively or in addition, the finger of the belt-type conveyor device may however also have a prior curvature, for example in order to reduce the falling height of the piece goods and/or in order to permit an adaptation of the belt-type conveyor device to the height of the stack and/or pile which decreases as the stack and/or pile is cleared away. With regard to the corresponding features and the resulting advantages, reference is, in order to avoid unnecessary repetition and for the sake of improved comprehensibility, made to the detailed discussion of the corresponding features given below.

In order that the piece goods removed from the stack and/or pile can be received without being damaged and in a reliable manner, it is possible for the belt-type conveyor device to be adjusted progressively further downward with decreasing height of that region of the stack and/or pile which is adjacent to the belt-type conveyor device. This need not be performed in continuous fashion, but rather may also be performed in stepped fashion. For example, it is initially the case that the belt-type conveyor device is positioned high enough that the piece goods do not fall too far before they are collected by the belt-type conveyor device. At a later point in time, the belt-type conveyor device is set low enough that the piece goods can still be moved downward from the remaining stack and/or pile onto the belt-type conveyor device without problems.

For the control of the finger unit during the handling of the piece goods, it is expedient for the position and/or the contour of the stack and/or pile of packages to be at least partially captured by at least one sensor. It is thus possible for the finger unit to be moved in targeted fashion to the piece goods situated on the stack and/or pile in order to remove said piece goods from the stack and/or pile. The capturing of the stack and/or pile is possible easily and in a precise manner if an optical sensor, in particular a camera, is used. The movement of the finger unit can then be controlled at least partially in a manner dependent on the position and/or contour of the stack and/or pile of piece goods as captured by the sensor. It is accordingly possible for piece goods to be removed without problems from stacks and/or piles of different form, without specific manual adaptation of the method having to be performed in each case. This increases the flexibility and efficiency of the method.

At least a part of the position and/or of the contour of the stack and/or pile can be determined easily and in a precise manner for example by way of triangulation. Here, triangulation is a geometric method of optical distance measurement by way of precise angle measurement within triangles. The calculation is performed by way of trigonometric functions. The triangulation furthermore requires at least two sensors for precise distance measurement and direction finding of individual points of the stack and/or pile proceeding from the sensors.

To prevent damage to, in particular, sensitive piece goods, use may be made of a finger unit having at least one pressure sensor, preferably on at least one flank element. The pressure sensor then transmits, for example, the measured pressure to a control unit, which thereupon controls the finger unit such that a predefined maximum pressure is not exceeded. Alternatively or in addition, it is however also possible, by way of the at least one pressure sensor, for the finger unit to be controlled such that an adequate pressure is applied to the at least one item of piece goods by the finger unit in order to be able to safely and reliably remove the at least one item of piece goods from the stack and/or pile.

The method is not restricted to the use of a finger unit. It is rather possible for multiple finger units to be used simultaneously and/or in succession. To simplify the method, and in order to make it possible for even large, in particular wide stacks and/or piles of piece goods to be cleared away, use may be made of a multiplicity of finger elements. The finger units may then, over the width of the stack and/or pile, at least partially grip different piece goods and move them from the stack and/or pile. In this way, it is for example possible for heavy goods vehicles, trailers, semitrailers and containers to be unloaded quickly. Here, for the sake of simplicity, it is expedient for the finger elements to be arranged adjacent to one another. It is thus easily possible for piece goods distributed over the width of the stack and/or pile to be gripped. It is particularly expedient for the finger elements to be combined to form a common hand unit. It is thus possible, by way of the movement of the hand unit, for the finger units to be moved jointly, which reduces the control outlay. Alternatively or in addition, it is furthermore expedient for the multiplicity of finger elements to be moved simultaneously, and parallel to one another, in the approach direction, gripping direction and/or transport direction. This simplifies the execution of the method and the control of the fingers. This is all the more applicable the more said movements are performed jointly.

It may alternatively or additionally be provided that the multiplicity of fingers is distributed substantially over the entire width of the stack and/or pile and/or over the entire width of a loading space which has the stack and/or pile, in particular of a heavy goods vehicle, semitrailer, trailer, container, transport container, interchangeable container and/or rolling container. This offers the advantage that the stack and/or pile can be cleared away over its entire width simultaneously.

In a first particularly preferred refinement of the method, the piece goods lying on the stack and/or pile are moved from the stack and/or pile onto the conveyor belt of the belt-type conveyor device by way of a method according to the embodiments disclosed herein. Thus, the auto-adaptive characteristic of the finger unit is utilized both during the transporting of the piece goods from the stack and/or pile onto the belt-type conveyor device and during the collecting and transporting of the piece goods by the belt-type conveyor device. Through the use of the method according to the embodiments disclosed herein, the advantages already discussed in this context are basically attained in the same way.

Alternatively or in addition, the use of a belt-type conveyor device according to one of the embodiments disclosed herein is expedient, whether it be for transporting the piece goods from the stack and/or the pile onto the belt-type conveyor device provided laterally adjacent to the stack and/or pile, or actually as the belt-type conveyor device positioned laterally adjacent to the stack and/or pile of piece goods. In this case, too, the advantages discussed in conjunction with the embodiments disclosed herein are basically attained, to which reference is made at this juncture for the sake of avoiding unnecessary repetition and for improved comprehensibility.

If the free end of the belt-type conveyor device is adjusted progressively downward with decreasing height of that region of the stack and/or pile which is adjacent to the belt-type conveyor device, it can be achieved that the piece goods initially do not fall too far from the stack and/or pile onto the belt-type conveyor device, in order that damage to the piece goods is prevented. Furthermore, however, it can also be achieved that piece goods pass downward onto the belt-type conveyor device without problems even when the stack adjacent to the belt-type conveyor device has already been largely cleared away. Here, continuous adjustment of the belt-type conveyor device is not necessary. Rather, a stepped adjustment of the belt-type conveyor device is adequate.

The belt-type conveyor device can be adjusted particularly easily and precisely by virtue of the finger unit being adjusted by way of a drive unit. Here, the at least two flank elements can be adjusted relative to one another in a longitudinal direction of the finger unit. This then has the effect that the finger unit of the belt-type conveyor device is adjusted between at least one curved position and one straightened position and back again as required.

If the piece goods are heavy enough and the finger unit is set to be flexible enough, it is possible for at least one item of piece goods conveyed by the conveyor belt to locally impress the finger unit, in particular at least one flank element, such that the finger unit, in particular the at least one flank unit, is, adjacent to the item of piece goods, deflected upward, in particular in the direction of the item of piece goods. In this way, partial gripping of the item of piece goods can be realized. It is thus basically possible for the contact area of the item of piece goods on the conveyor belt to be enlarged. Alternatively or in addition, it is also possible for more reliable conveyance of the item of piece goods on the conveyor belt to be achieved.

Here, the flexibility of the finger device can basically be reduced by way of a reduction of the number of webs in relation to the longitudinal extent of the finger element. By contrast, for an increase in stability, it may be expedient for the number of webs per unit of length of the filter element to be increased.

In the case of the belt-type conveyor according to an embodiment disclosed herein, it is provided, in a first particularly preferred refinement, that the at least two flank elements and the multiplicity of webs are connected to one another and designed such that an impressing of at least one flank element in an impressing direction oblique, in particular perpendicular, to the longitudinal extent of the flank element results in a deflection of the flank element, outside the impressed region, in a direction opposite to the impressing direction. This behavior of the finger unit, which can be achieved and set by way of the orientation of the flank elements relative to one another and the orientation of the webs relative to the flank elements, permits an auto-adaptive adjustment of the finger element to the shape of the piece goods and thus an adaptation of the belt-type conveyor device even to very different piece goods. Thus, the contact area between the conveyor belt and the item of piece goods is enlarged, and the piece is held and supported more reliably by the conveyor belt. This ultimately results in substantially disruption-free operation of the belt-type conveyor device.

To ensure a suitable adjustment of the finger unit by way of local impressing of the finger unit, and in order to easily permit an adjustment in the direction of the initial position, it is expedient in particular for the adjustment of the flank elements from the at least one straightened position into the at least one curved position to be performed counter to a restoring force, in particular of the flank elements. Through the suitable selection of the restoring force, the deformation of the finger unit can be influenced in a desired manner. The lower the restoring force, the more flexible the finger unit basically is, and vice versa. It is furthermore particularly preferable if the adjustment of the flank elements from the at least one curved position into the at least one straightened position is effected, in particular exclusively, by way of the restoring force. The finger element then has the tendency to repeatedly automatically adjust in the direction of an initial position in the absence of the load. The restoring force may also be provided at least partially by at least one additional spring element. This is expedient in particular for the situation in which the corresponding flank element is in the form of a link chain with movably connected, if necessary rigid, chain links.

In order to provide the required flexibility of the finger element and in order to ensure the at least partial gripping of the at least one item of piece goods, it is expedient if the multiplicity of webs and the at least two flank elements form in each case an acute angle, preferably between 5° and 85°, and an obtuse angle, preferably between 95° and 175°. By contrast, right angles may be less preferable, because an auto-adaptive adjustment of the at least one flank element can be impeded.

In order that, by way of the adjustment of the finger unit, an action can be exerted on the conveyor belt that is in contact with the at least one item of piece goods, it is expedient if the conveyor belt is guided along at least one flank element of the finger unit. For this purpose, it is even more expedient for the conveyor belt to be supported at least partially by the corresponding flank element.

Alternatively or in addition, the conveyor belt may be guided along the flank element such that the conveyor belt can press under load against the flank element. It is thus possible for the finger unit, as an interaction, to adjust in auto-adaptive fashion into a curved position. In said curved position, it is then possible for the finger unit and/or the conveyor belt to at least partially grip the at least one item of piece goods.

The belt-type conveyor device can be used particularly expediently if at least one end of the at least one finger unit has a deflection, in particular deflection roller, for deflecting the conveyor belt. The corresponding end of the finger unit may in this case particularly preferably be assigned to a free end of the belt-type conveyor device. Owing to the deflection, the conveyor belt can be easily adjusted upward or downward by way of the finger unit. This also applies to the free end of the belt-type conveyor device if the corresponding end of the finger unit is provided at the free end of the belt-type conveyor device. Against this background, it is thus expedient for the finger unit to be provided at a free end of the belt-type conveyor.

One end of the finger unit can be adjusted in a particularly expedient manner if the at least two flank elements are connected directly to one another at the corresponding end of the at least one finger unit. The connection to one another is in this case realized without a web being provided between the flank elements. Here, for the adjustment of the tip of the finger unit, it is particularly preferred for the at least two flank elements to be connected to one another by way of their free ends.

In order that the finger unit can be curved even in the absence of a corresponding action of an item of piece goods, at least one drive unit may be provided for adjusting the at least two flank elements relative to one another in a longitudinal direction of the finger unit. By way of the adjustment of the at least two flank elements relative to one another in the longitudinal direction of the finger element, it is possible for the finger element to be adjusted from at least one straightened position into a curved position and back. In this way, it is ultimately possible for an at least sectional curvature of the belt-type conveyor device to be predefined by way of the finger unit.

BRIEF DESCRIPTION OF THE SEVERAL VIEWS OF THE DRAWING

Below, the invention will be discussed in more detail on the basis of a drawing, which illustrates merely exemplary embodiments of the invention. In the drawing:

FIGS. 2A-C show the functional principle of the finger unit from FIG. 1 during the adjustment of flank elements relative to one another;

DETAILED DESCRIPTION OF THE INVENTION

Figure 1:
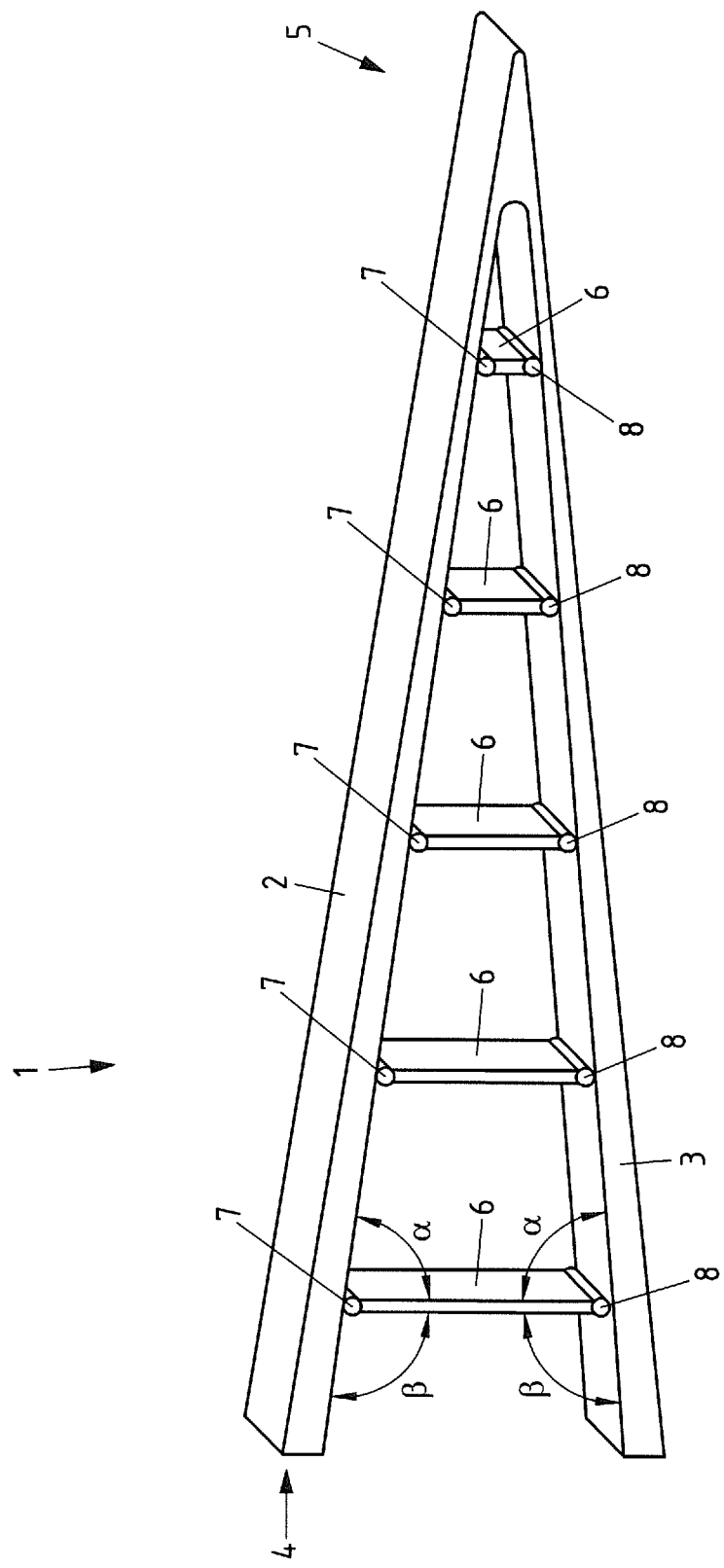
FIG. 1 shows a finger unit of a belt-type conveyor device according to the invention, and/or for carrying out the method according to the invention, in a side view.

FIG. 1 illustrates a finger unit 1 which permits an auto-adaptive deformation. The finger unit 1 has two flank elements 2, 3 which, in the case of the illustrated and thus preferred finger unit 1, run jointly from one end 4 of the finger unit 1 to the opposite end 5 of the finger unit 1. Furthermore, in a longitudinal direction of the finger unit 1, the flank elements 2, 3 move continuously closer together. Whereas the flank elements 2, 3 are spaced apart from one another at one end 4 of the finger unit 1, the flank elements 2, 3 are directly connected to one another at the other end 5 of the finger unit 1. Therefore, a finger unit 1 is realized which narrows, and tapers conically, in one direction.

Webs 6 are provided, so as to be distributed over the length of the finger unit 1, between the flank elements 2, 3, by way of which webs the flank elements 2, 3 are connected to one another. In the case of the illustrated and thus preferred finger unit 1, the webs 6 are, at the two opposite ends 7, 8, articulatedly connected to the flank elements 2, 3 by way of joints. It would alternatively be possible for the webs 6 to be of flexible form. In the case of the illustrated and thus preferred finger unit 1, the webs 6 are distributed at uniform intervals over the length of the finger unit 1. This is however not imperatively necessary. It is also not imperatively necessary for the webs 6 to run parallel to one another, as in the case of the illustrated finger unit 1. It is however preferable for the webs 6 to form, with each of the flank elements 2, 3, an acute angle α on one side and an obtuse angle 3 on the opposite side.

Figure 2A:
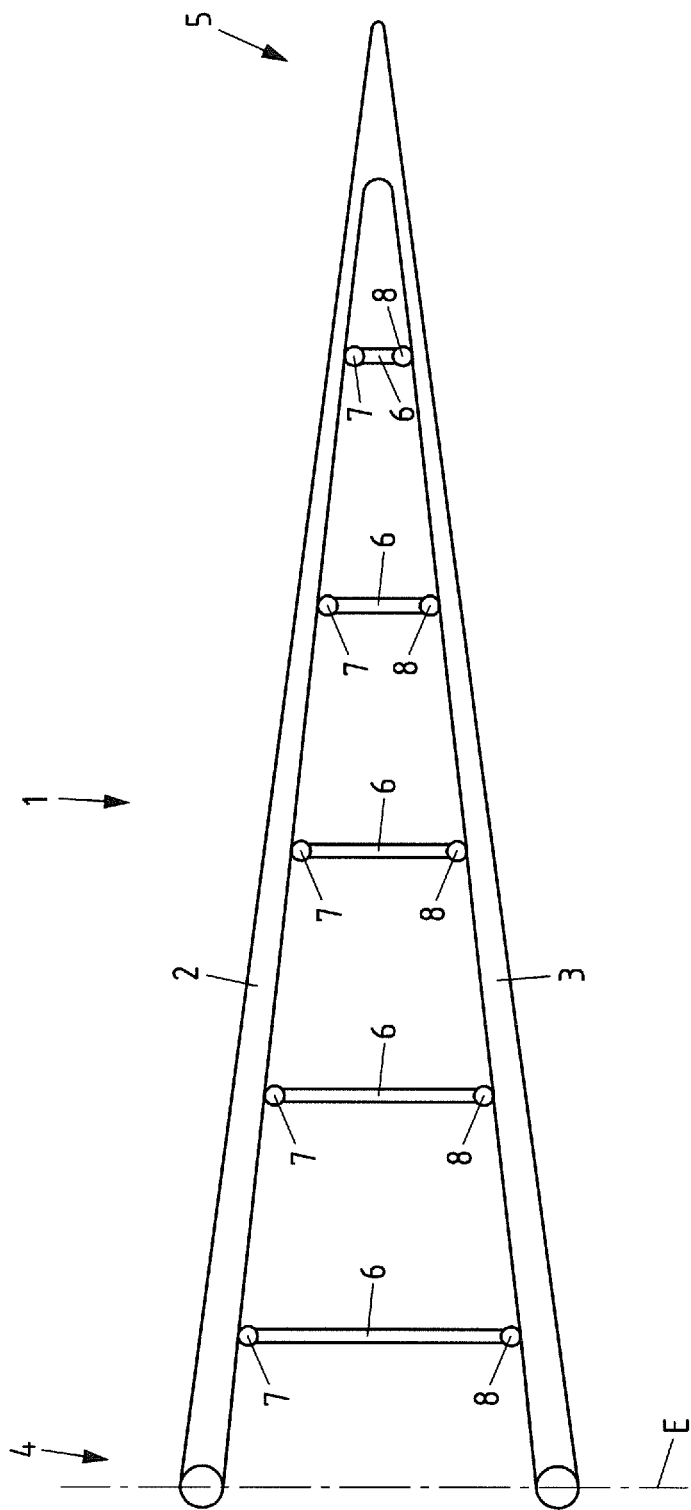
Figure 2C:
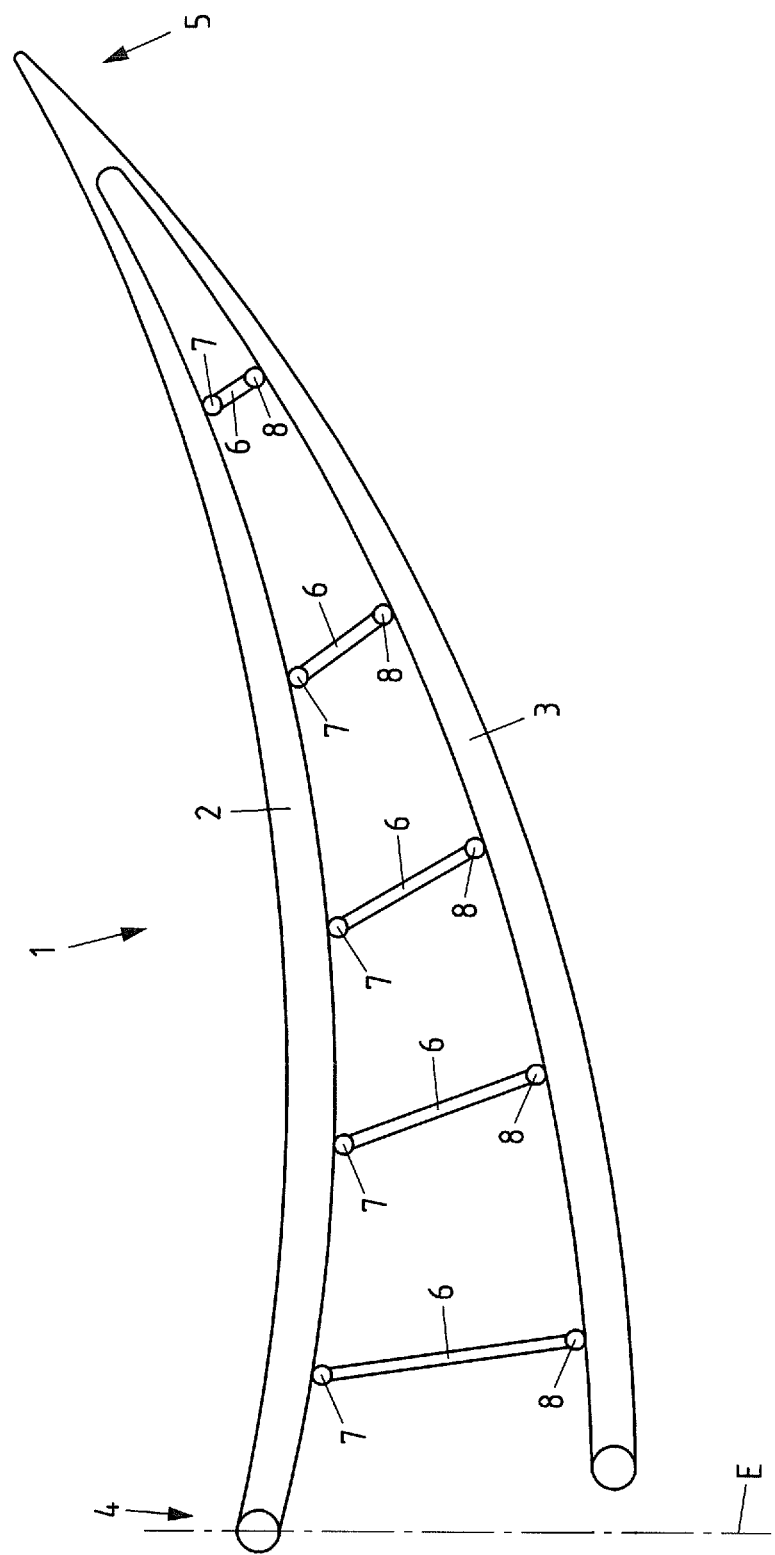

The illustrated and thus preferred flank elements 2, 3 are of flexible form, such that the flank elements 2, 3 can bend about an axis perpendicular to the longitudinal extent of the finger unit 1, as illustrated in particular in FIGS. 2A-C. For this purpose, it is expedient if the flank elements 2, 3 are formed from a flexible plastic or for example from rubber. The webs 6 may likewise be formed from plastic or for example from a metal, because the webs 6 need not exhibit flexibility. In FIG. 2A, the finger unit 1 from FIG. 1 is illustrated in an initial position, in which the finger unit 1 is present in a straightened orientation, wherein the free ends of the flank elements 2, 3 are arranged in a plane E. In the case of the illustrated and thus preferred finger unit 1, the flank elements 2, 3 are, in this position, formed at least substantially symmetrically with respect to one another.

If it is then the case, as per FIG. 2B, that the free end of the upper flank element 2 is, relative to the initial position, displaced forward out of the illustrated plane E in the longitudinal direction of the finger unit 1, the finger unit 1 curves downward owing to the connection of the flank elements 2, 3 by way of the multiplicity of webs 6. In this way, that end 5 of the finger unit 1 which is illustrated on the right is adjusted downward. The finger unit 1 curves upward in an analogous manner, as per FIG. 2C, wherein the corresponding end 5 of the finger unit 1 is adjusted upward when the free end of the lower flank element 3 is displaced forward out of the plane E in the longitudinal direction of the finger unit 1 in the direction of the curving tip of the finger unit 1. It also emerges from FIGS. 2A-C that the struts 6 between the flank elements 2, 3 are inclined in different directions in the event of the finger unit 1 curving in opposite directions.

To effect the displacement of the flank elements 2, 3 analogously to FIGS. 2A-C, a drive unit (not illustrated) may be provided. Here, suitable drive units are known from the prior art. Suitable drive units may for example have at least one linear drive. It is thus possible for at least one flank element 2, 3 to be adjusted forward and backward in the longitudinal direction of the finger unit 1 without problems.

The illustration does not show that it is also possible for more than two, for example at least three or four, flank elements to be provided. For the sake of simplicity, these are then arranged so as to be distributed, in particular uniformly, about a longitudinal axis of the finger unit. The multiple flank elements may then converge, in particular by way of free ends, at a common tip of the finger unit. Furthermore or alternatively, the webs may preferably connect in each case all flank elements to one another.

The illustrated and thus preferred flank elements 2, 3 are of strip-shaped form. A plate-shaped or bar-shaped form of the flank elements would however also be possible.

Figure 3:
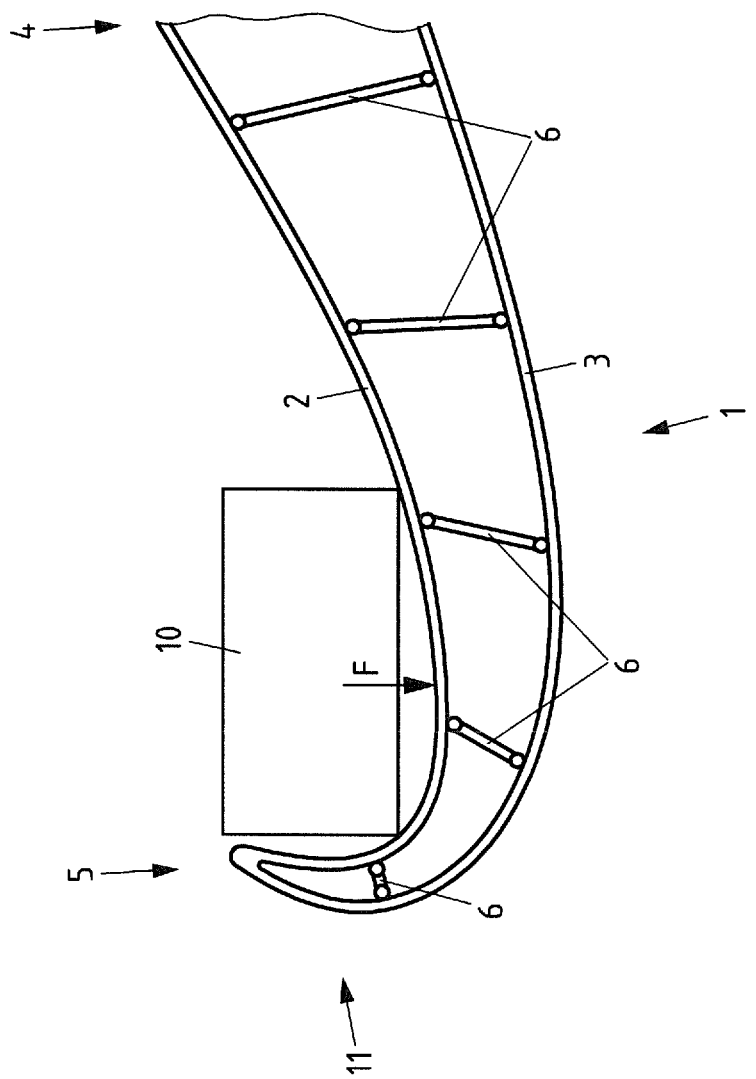
FIG. 3 shows a functional principle of the finger unit from FIG. 1 during the auto-adaptive adjustment of a flank.

The described finger unit 1 may however also be adjusted in a different manner than that illustrated in FIGS. 2A-C, specifically as per FIG. 3, which shows an auto-adaptive adjustment of a flank element 2, 3 of the finger unit 1 when an item of piece goods 10 presses the corresponding flank element 2 inward in relation to the finger unit 1. Here, it is basically not of importance whether the item of piece goods 10 presses against the finger unit 1 or the finger unit 1 presses against the item of piece goods 10. In any case, the corresponding flank element 2 is displaced locally inward in relation to the finger unit 1 in the direction of the pressure force F, which has the effect, owing to the coupling of the flank elements 2, 3 by way of the webs 6, that the flank element 2 is, at a different location, curved in the direction of the item of piece goods 10, specifically in the direction of the two connected-together ends 11 of the flank elements 1 at that end 5 of the finger unit 1 which is illustrated on the left, that is to say is adjusted outward in relation to the finger unit 1 counter to the pressure force F, or in the present case upward. In this way, the item of piece goods 10 is partially gripped by the finger unit 1.

Figure 4:
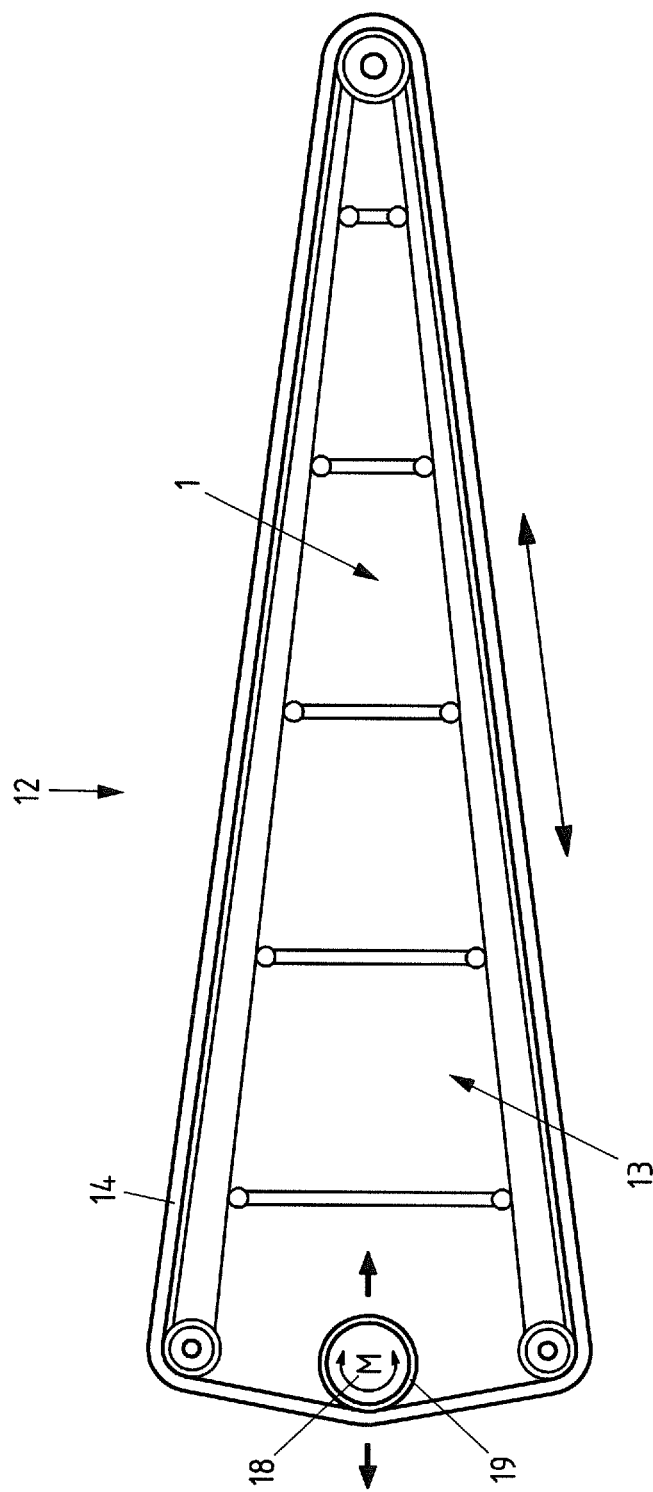
FIG. 4 shows a belt-type conveyor device according to the invention in a schematic side view.

FIG. 4 illustrates a belt-type conveyor device 12 in the case of which the supporting structure 13 of the belt-type conveyor device 12 is composed of a finger unit 1 as per FIG. 1. The conveyor belt 14 of the belt-type conveyor device 12 circulates around the supporting structure 13 and thus around the finger unit 1. For this purpose, the illustrated and thus preferred belt-type conveyor device 12 has multiple deflections in the form of deflection rollers 15, 16, 17. One deflection roller 15 is provided at the connected-together ends 11 of the flank elements 2, 3, wherein the deflection roller 15 is ultimately borne and supported by the corresponding end 5 of the finger unit 1. Furthermore, in each case one deflection in the form of a deflection roller 16, 17 is provided on the free ends of the flank elements 2, 3. Furthermore, a drive 18 is provided which, in the case of the illustrated and thus preferred belt-type conveyor device 12, can drive the conveyor belt 14 in different directions. The drive 18 is realized by way of a drive roller 19 which can be adjusted as required for the purposes of tensioning the conveyor belt 14, for example in a longitudinal direction of the finger unit 1. Furthermore, for slip-free drive of the conveyor belt 14, a toothing may be provided on the conveyor belt 14, which toothing meshes with a toothing of the drive roller 19. By contrast to the illustrated and thus preferred belt-type conveyor device 12, the supporting structure 13 around which the conveyor belt 14 circulates may have not only the finger unit 1 but also further supporting structure parts.

In the case of the illustrated and thus preferred belt-type conveyor device 12, the conveyor belt 14 is guided along the flank elements 2, 3, specifically in such proximity that the conveyor belt 14 can, as required, be pressed against a flank element 2, 3 by an item of piece goods 10. Here, the finger unit 1 can be adjusted auto-adaptively in relation to the corresponding item of piece goods 10, as has been described in principle in conjunction with FIG. 3. Alternatively or in addition, in the case of the finger unit 1 of the belt-type conveyor device 12 illustrated in FIG. 4, the flank elements 2, 3 can be displaced relative to one another in a longitudinal direction of the finger unit 1, as has been described in principle in conjunction with FIGS. 2A-C. With the associated adjustment of an end 5 of the finger unit 1 in a direction perpendicular to the longitudinal extent of the finger unit 1, the conveyor belt 14, and the profile thereof around the finger unit 1, are also adjusted. If it is sought for the conveyor belt 14 to be guided along the flank elements 2, 3 with a small spacing thereto even in the case of a curved finger unit 1, it is necessary, as required, for further devices (not illustrated) for the positioning of the conveyor belt 14 to be provided, between the deflection rollers 15, 16, 17, adjacent to the flank elements 2, 3 or to the at least one flank element 2, 3.

Figure 5:
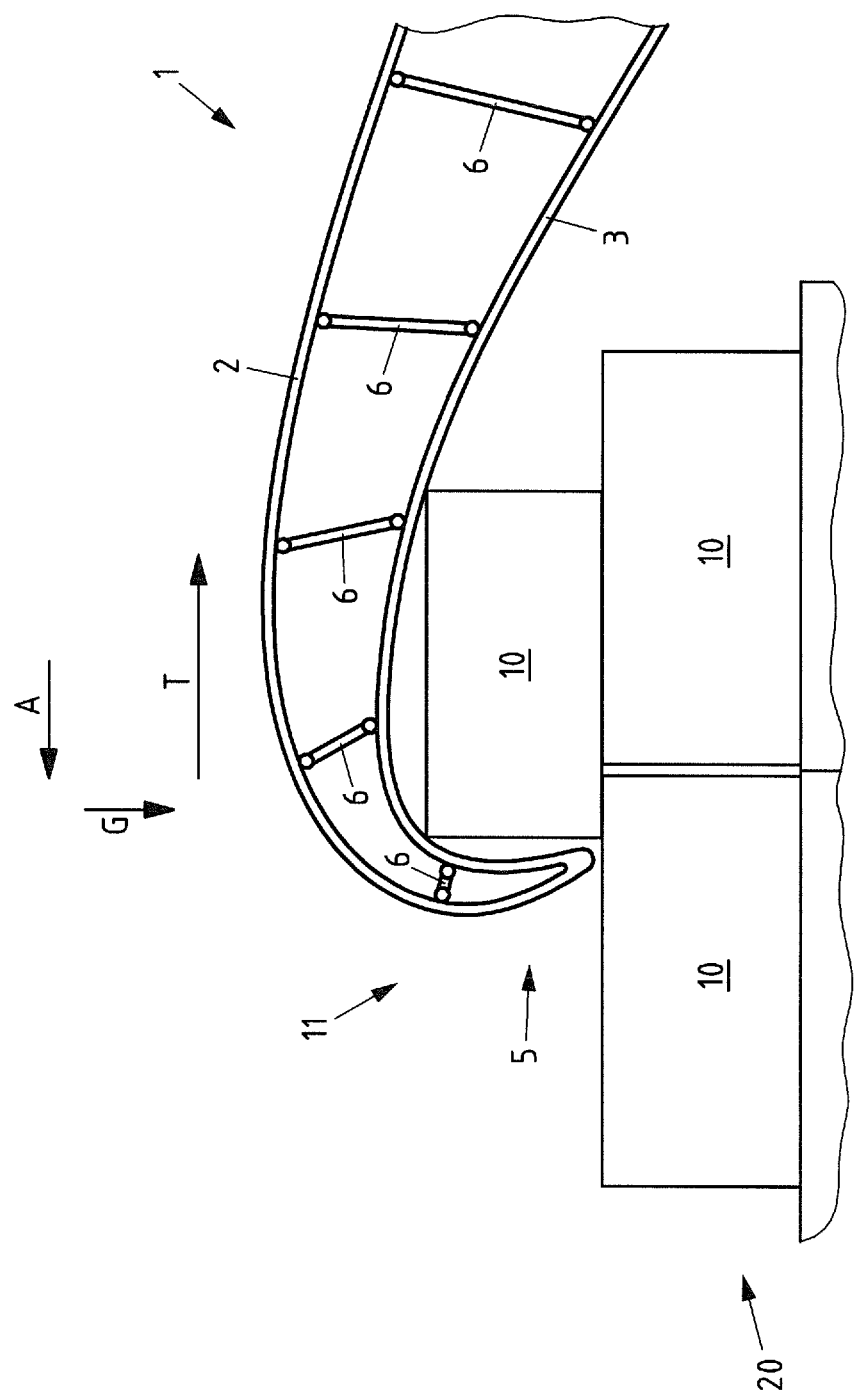
FIG. 5 shows the auto-adaptive adjustment of the finger unit to an item of piece goods in accordance with a method according to the invention, in a schematic side view.

FIG. 5 illustrates the use of a finger unit 1 for the removal of piece goods 10 which are situated on a stack 20 of piece goods 10 in the form of packages. Here, only the upper part of the stack 20 is illustrated, and the arrows above the finger unit 1 illustrate a movement sequence which is performed by the finger unit 1 repeatedly in the illustrated and thus preferred method process. Firstly, the finger unit 1 is moved over the stack 20 in an approach direction A toward the rear side of the stack 20 in relation to the finger unit 1, in order to bring the finger unit 1 in overlap with the stack 20. Subsequently, the finger unit 1 is lowered onto the stack 20 of piece goods 10 in a gripping direction G until the finger unit 1 presses partially against the item of piece goods 10. This results in the above-described auto-adaptive adjustment of the lower flank element 3, which is associated with a corresponding adjustment of the upper flank element 2. Here, the free end 5 of the finger unit 1 curves downward and partially grips the item of piece goods 10 situated under the finger unit 1. Said gripping action may also be regarded as the item of piece goods 10 being engaged behind. Subsequently, the finger unit 1 is moved in a transport direction T. In the illustrated and thus preferred exemplary embodiment, the transport direction T is oriented oppositely to the approach direction A and perpendicular to the gripping direction G. This situation may however be deviated from as required. However, the gripping direction G should have a movement component which is perpendicular both to the approach direction A and to the transport direction T. By way of the movement of the finger unit 1 in the transport direction T, the partially gripped item of piece goods 10 lying on the stack 20 of piece goods 10 is moved from the stack 20. In the illustrated exemplary embodiment, this takes place in the transport direction T.

Figure 6:
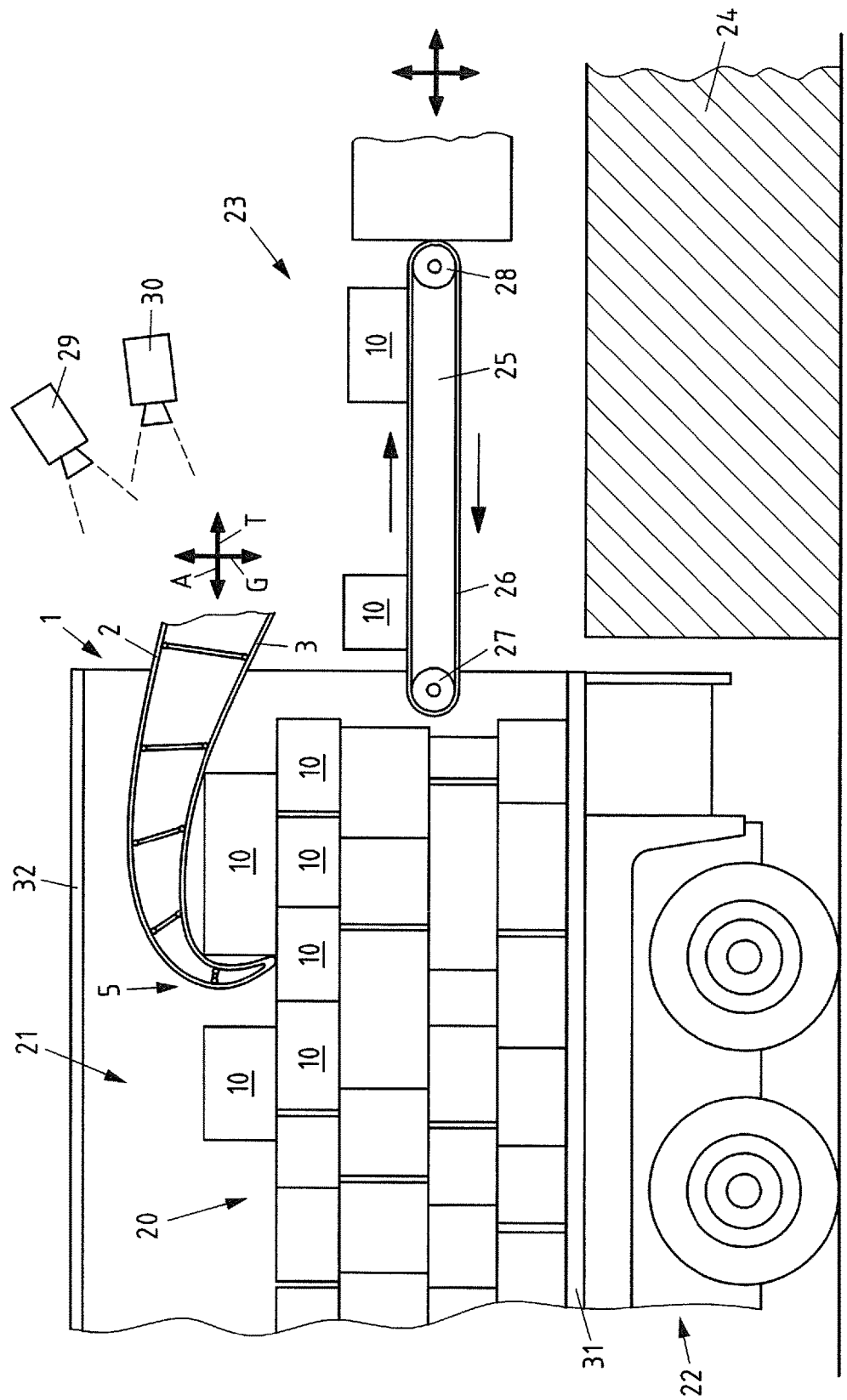
FIG. 6 shows the functional principle of a first method according to the invention in a schematic illustration.

The finger unit 1 and the stack 20 as per FIG. 5 are, in FIG. 6, provided in a loading space 21 of a heavy goods vehicle, trailer or semitrailer 22. The finger unit 1 is in this case held in movable fashion such that the finger unit 1 can be moved both forward and backward and upward and downward. It is thus possible for the finger unit 1 to remove piece goods 10 from the stack 20 and gradually clear away even a very deep stack 20 of piece goods 10. For this purpose, a belt-type conveyor device 23 may be positioned laterally with respect to the stack 20 of piece goods 10, so as to be spaced apart therefrom or adjacent thereto, in order to collect and transport away the piece goods 10 that have been removed from the stack 20 by the finger unit 1. Here, the belt-type conveyor device 23 is positioned for example on a loading ramp 24. For this purpose, the belt-type conveyor device 23 can be moved forward and backward, and may in particular be telescopable. It is accordingly possible for the belt-type conveyor installation 23 to be moved gradually further into the loading space 21 as the stack 20 is gradually cleared away. The belt-type conveyor device 23 comprises a support structure 25 around which the conveyor belt 26 circulates around deflections in the form of deflection rollers 27, 28 in the direction illustrated by the arrows. In particular in the case of a telescopic belt-type conveyor device 23, it is also possible for multiple conveyor belts 26 to be provided one behind the other for the purposes of transporting the piece goods 10.

In the illustrated and thus preferred exemplary embodiment, at least two optical sensors 29, 30 in the form of cameras are provided for controlling the movement of the finger unit 1. The sensors 29, 30 capture the stack 20 or at least an upper part thereof. From the images and the position of the sensors 29, 30 relative to one another, at least a part of the contour of the stack 20 and the position of the contour is captured as a distance and direction in relation to the sensors 29, 30. The at least partial determination of the position and contour of the stack 20 is realized by way of the known method of so-called triangulation. Alternatively, it is however also possible for one, preferably optical, sensor to be adequate for controlling the movement of the finger unit 1. It is however likewise possible for more than two, preferably optical, sensors to be provided. Then, potentially even more precise control and/or spatially more complex control is possible, for example because the stack can be captured in three dimensions more effectively and/or with greater precision.

If it is detected on the basis of the sensors 29, 30 that the height of the stack 20 has decreased, in particular adjacent to the belt-type conveyor device 23, in particular because the stack 20 has already been partially cleared away there, the position of the belt-type conveyor unit 23 can likewise be lowered. It is thus possible for the piece goods 10 to always be moved by the finger unit 1 onto the conveyor belt 26 of the belt-type conveyor device 23 under the action of gravitational force without problems. It would be possible for the belt-type conveyor device 23 to be adjusted initially to a height which lies slightly above the loading floor 31 of the loading space 21. However, if the stack 20 of piece goods 10, adjacent to the belt-type conveyor device 23, reaches to just below the roof 32 of the loading space 21, those piece goods 10 which are removed from the stack 20 first would fall a very great distance downward onto the belt-type conveyor device 23. This can lead to damage to the piece goods 10 or, in the case of packages, to damage to at least the packaging. It is therefore expedient for the belt-type conveyor device 23 to be lowered during the clearing-away of the stack 20.

When the finger unit 1 has removed a partially gripped item of piece goods 10 from the stack 20, the item of piece goods 10 can thus fall downward onto the belt-type conveyor device 23. Since the flank elements 2, 3 of the illustrated finger unit 1 are of elastic form and impart a restoring force counter to the deformation during the partial gripping of the item of piece goods 10, the item of piece goods 10 is no longer held by the finger unit 1 after having been pulled from the stack 20. The item of piece goods 10 falls downward and the finger unit 1 returns into its straightened initial position owing to the restoring force of the flank elements 2, 3. The finger unit 1 can then be introduced into the loading space 21 again, above the remaining stack 20, in the approach direction A. When the finger unit 1 is then positioned above the stack 20 again, the finger unit 1 can be moved downward again in the gripping direction G and at least partially grip at least one further item of piece goods 10, which is then, by way of a movement of the finger unit 1, removed from the stack in the transport direction T and moved onto the belt-type conveyor device 23, by way of which the at least one item of piece goods 10 is transported away. It is self-evident that, in addition to the at least one item of piece goods 10 that is gripped by the finger unit 1, it is also possible, in one step, for further piece goods 10 to jointly be removed from the stack 20, specifically for example piece goods 10 which are situated at the edge of the stack 20. In the case of a stack 20 and/or pile which is not very deep, that is to say one which extends not very far in a direction parallel to the transport direction T or into the loading space 21, it is for example possible for the entire stack 20 and/or pile to be knocked over by the movement of the finger unit 1 and to fall onto the belt-type conveyor device 23 without the entire stack 20 and/or pile having to be gripped by the finger unit 1.

In the illustrated and thus preferred embodiment, the finger unit 1 may extend at least substantially over the width of the stack 20 and/or of the loading space 21 in order to be able to clear away the stack 20 over its entire width simultaneously. In order that the auto-adaptive deformation can adapt more effectively to stacks 20 of non-uniform shape, it is also possible for multiple finger units 1 to be arranged adjacent to one another so as to be distributed over the width of the stack 20 and/or of the loading space. Said multiple finger units may, as required, be controlled and/or moved independently of one another in order to realize effective handling of piece goods. It may alternatively or additionally be expedient for the finger unit 1 or each finger unit to be assigned a dedicated drive as required. It is then possible for the finger unit to be moved or for the finger units to be moved in particular independently of one another. A simplification in terms of method and construction may however also be provided, as required, in that multiple finger units 1, in particular all of the finger units 1, can be combined to form a hand unit. It is then possible, by way of the movement of the hand, which bears multiple finger units 1, to effect a common movement of the finger units 1 which are held on the hand unit, without the finger units 1 having to be moved separately. The described method may in this case be performed using only one hand unit or using a multiplicity of hand units. It is thus possible, for example, to realize an adaptation to varying stack widths or loading space widths.

In the exemplary embodiments illustrated here, the piece goods 10, in particular packages, have been brought together to form stacks 20. It would however alternatively also be possible for the piece goods 10 to have been brought together to form a pile, or to have at least partially been brought together to form a pile. The described methods and devices would then be implemented analogously as required.

Figure 7:
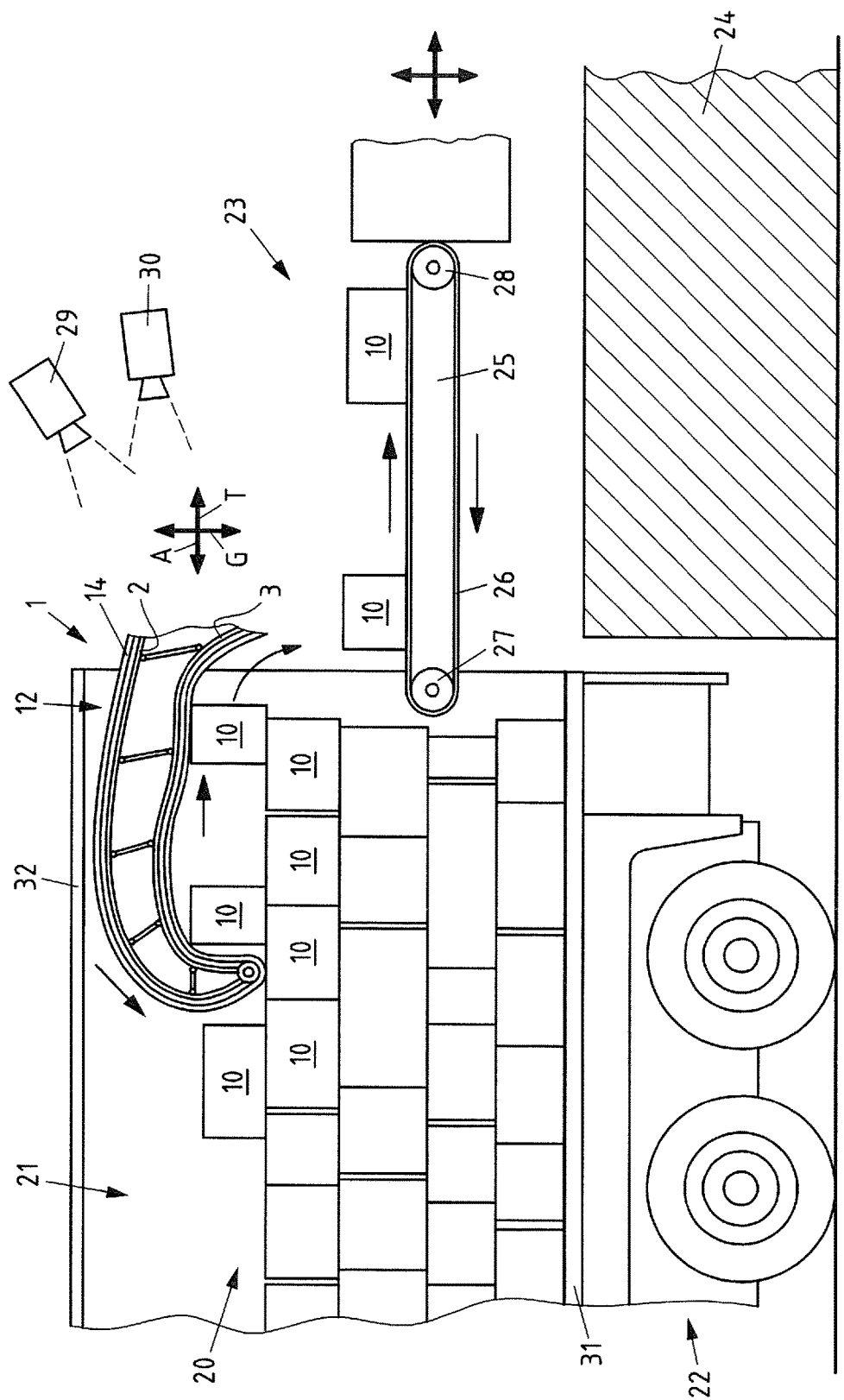
FIG. 7 shows the functional principle of a second method according to the invention in a schematic illustration.

FIG. 7 illustrates the method principle as per FIG. 6, with the difference that a finger unit 1 as part of a belt-type conveyor device 12 is used. A conveyor belt 14 circulates around the finger unit 1, which functions as supporting structure 13, in the direction of the arrows. The item of piece goods 10 at least partially gripped owing to the auto-adaptive adjustment of the finger unit 1 is, owing to the movement of the conveyor belt 14, moved from the stack 20 in the transport direction T and subsequently falls onto the belt-type conveyor device 12, which is provided at a slightly lower level. As the at least one item of piece goods 10 is moved from the stack 20, an auto-adaptive deformation of the finger unit 1 can be maintained, such that good contact between the conveyor belt 14 and the item of piece goods 10 is maintained at all times. The auto-adaptive deformation can travel together with the item of piece goods 10 along the belt-type conveyor device 12 or along the finger unit 1, wherein the auto-adaptive deformation will vary as required.

Owing to the use of the belt-type conveyor device 12 for removing piece goods 10 from the stack 20, the finger unit 1 has to be adjusted back and forth in the transport direction T and approach direction A less frequently as required. By way of progressive adjustment of the finger unit 1 or of the belt-type conveyor device 12 in the gripping direction G, it is possible for gradually further piece goods 10 to be gripped in auto-adaptive fashion and transported away in the transport direction T. In this way, the stack 20 can, as required, be cleared away at least to a not inconsiderable extent without the finger unit 1 having to be adjusted in the transport direction T and/or in the approach direction A.

If required, use may also be made of multiple belt-type conveyor devices 12, wherein these may be arranged adjacent to one another as has been described above with regard to the principle of a multiplicity of finger units 1. Here, the belt-type conveyor devices 12 may be moved and/or controlled separately or else may be joined together to form at least one hand unit, such that the belt-type conveyor devices 12 can be moved and/or controlled jointly by way of the hand unit. Here, it is furthermore expedient if the single belt-type conveyor device 12 or the multiplicity of belt-type conveyor devices 12 extends over at least substantially the entire width of the stack 20, pile and/or loading space 21.

Figure 8A:
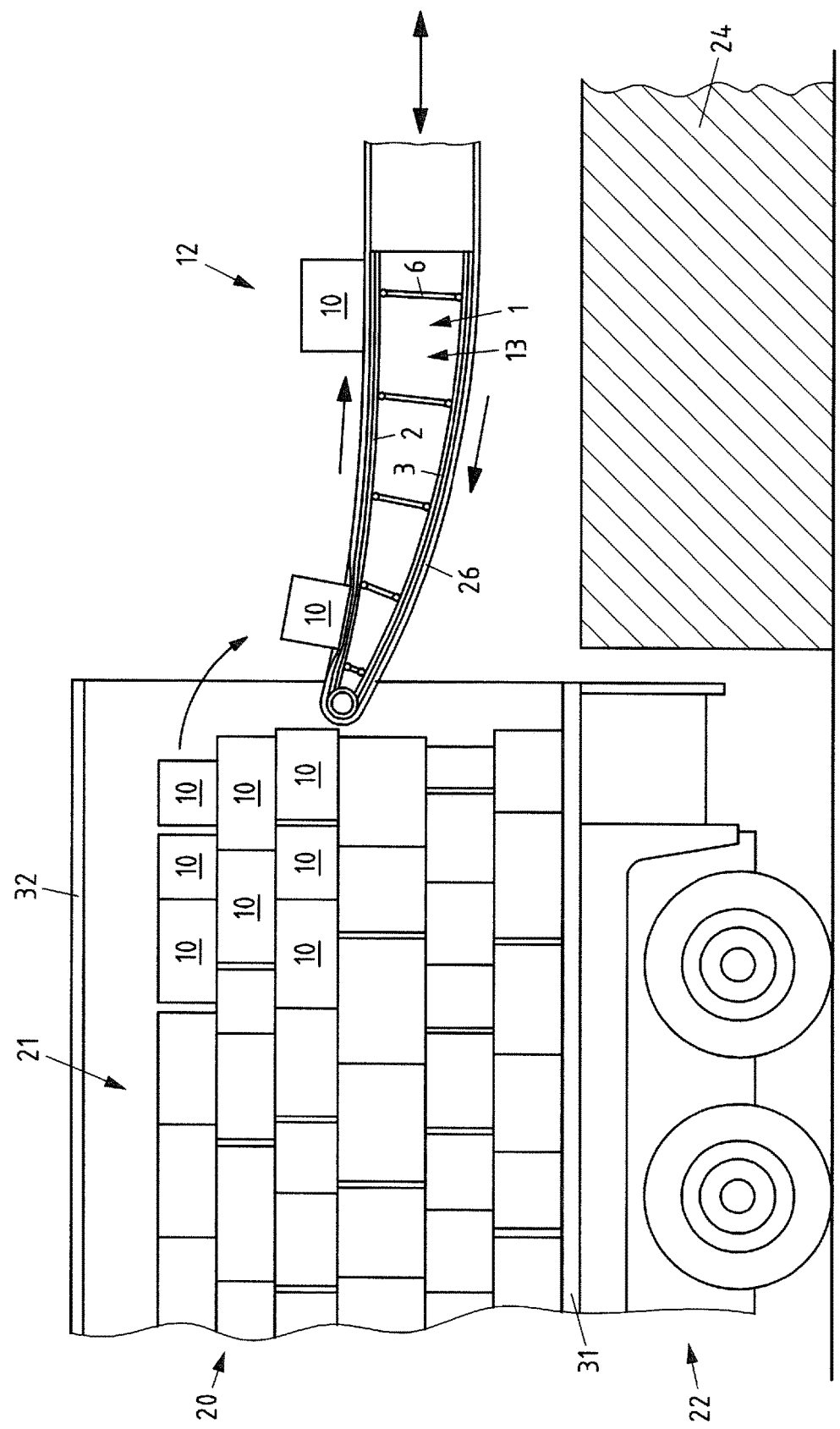
FIGS. 8A-C show a functional principle of a third method according to the invention in a schematic illustration.
Figure 8B:
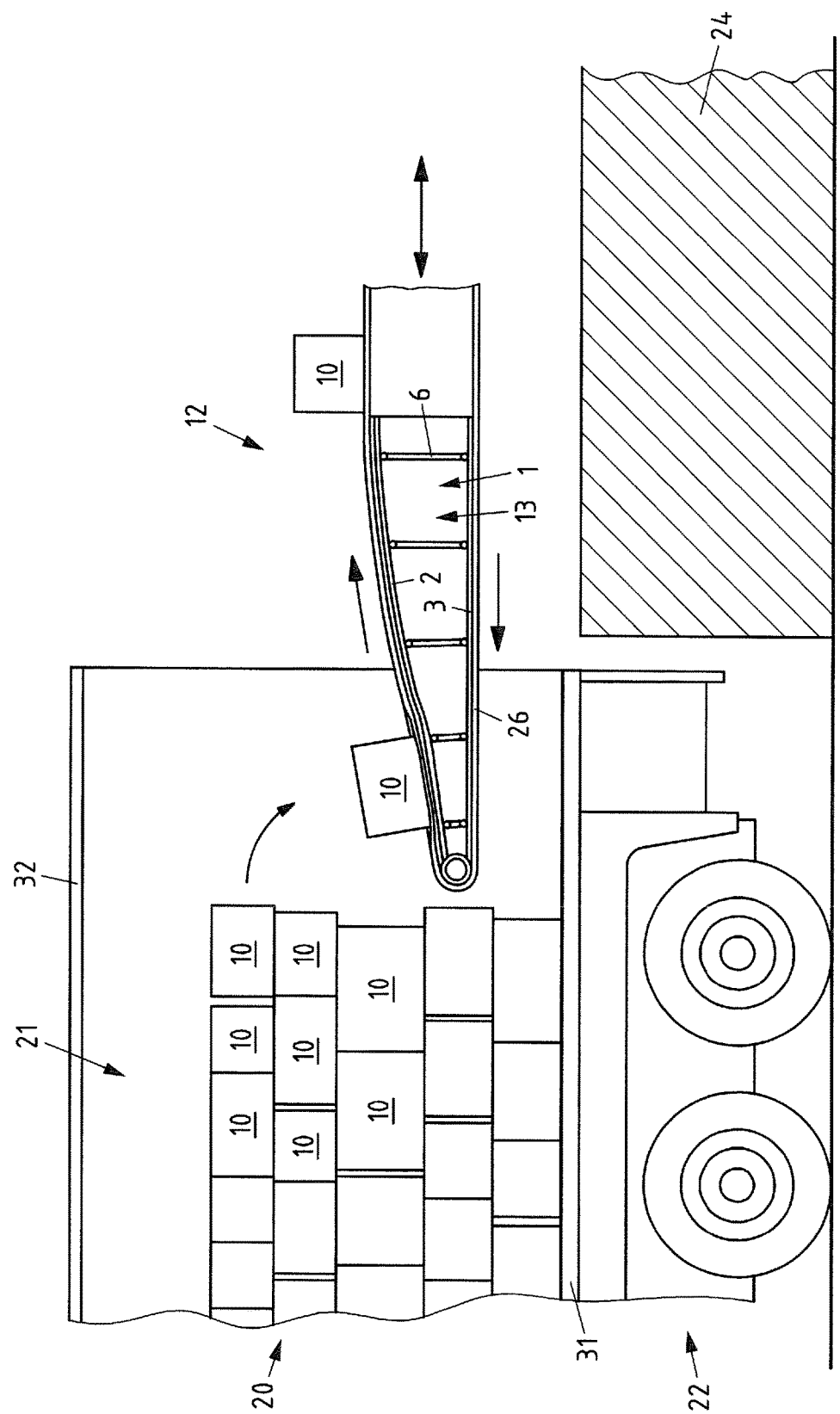
Figure 8C:
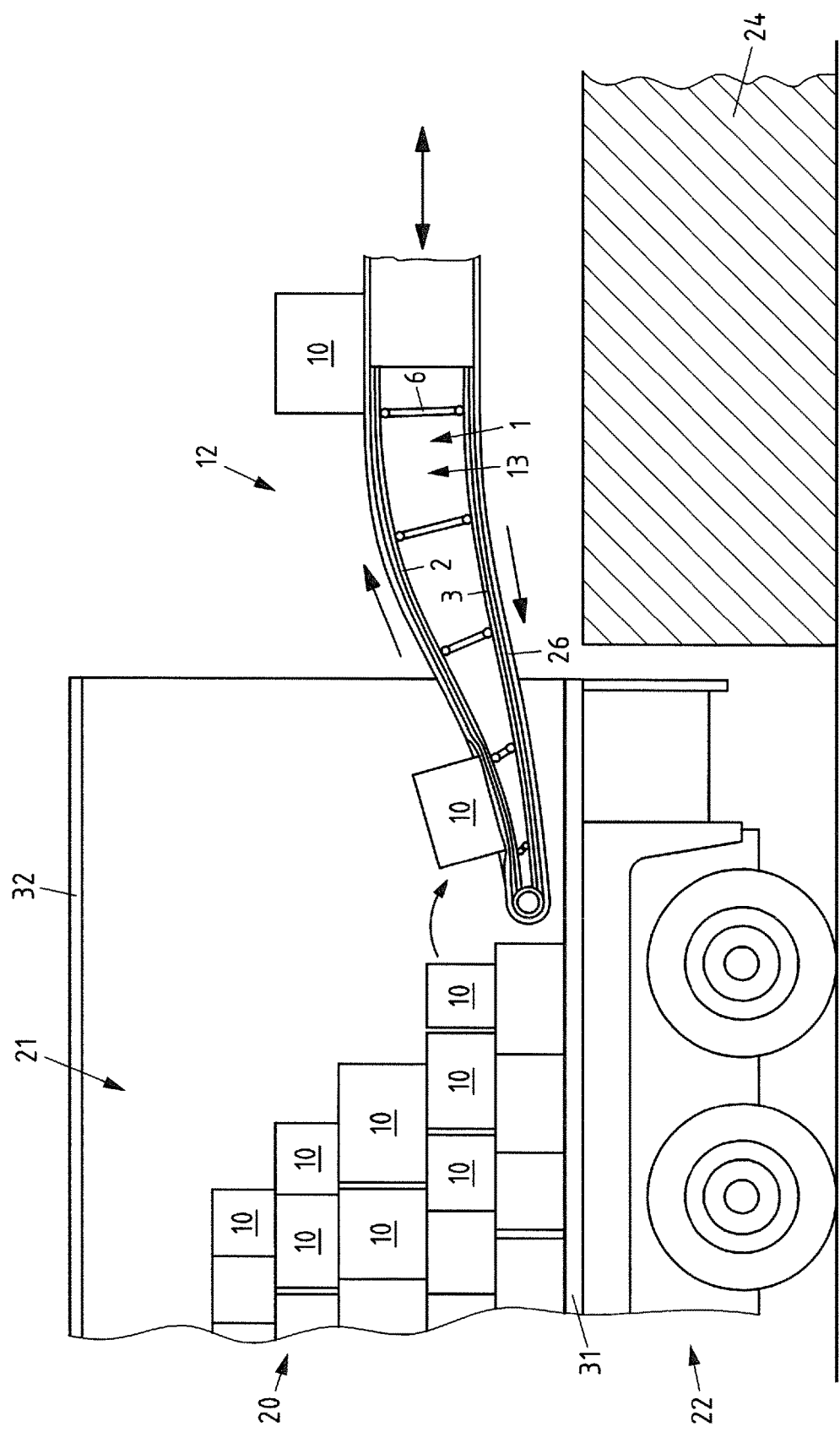

FIGS. 8A-C illustrate a further method process. In this, a belt-type conveyor device 12 having a finger element 1 at least as part of the supporting structure 13 is used and is positioned adjacent or behind the stack 20 of piece goods 10, in particular packages. The piece goods 10 are now moved onto the belt-type conveyor device 12 from the upper end of the stack 20. This may be performed manually or else using at least one further finger unit 1 as per FIG. 6 and/or at least one further belt-type conveyor device 12 as per FIG. 7.

The free end of the belt-type conveyor device 12 has a finger unit 1 as a supporting structure 13, which can be suitably curved by virtue of the flank elements 2, 3 being adjusted relative to one another in the longitudinal direction of the finger unit 1. Initially, the stack 20 of piece goods 10 is, adjacent to the belt-type conveyor device 12, very tall. In order that the piece goods 10 that are moved from the stack 20 do not fall down too far, the front end of the belt-type conveyor device 12 is, by way of a corresponding adjustment of the finger unit 1, bent upward, as illustrated in FIG. 8A. The adjustment is performed as has already been described in principle in conjunction with FIGS. 2A-C. When the stack 20 has been partially cleared away, the height of the stack 20 adjacent to the belt-type conveyor device 12 is also lower. In order that this does not lead to an impairment of the transporting-away of the piece goods 10, the curvature of the free end of the belt-type conveyor device 12 can be at least partially eliminated, as illustrated in FIG. 8B. In this position, the finger unit 1 is substantially straightened. Since the height of the stack 20 is smaller, it is the case in this position of the belt-type conveyor device 12, too, that no piece goods 10 or packages are damaged.

When the stack 20 has been cleared away yet further, only a very small height of the stack 20 remains, at any rate adjacent to the belt-type conveyor device 12. In order that the piece goods 10 can then still fall onto the belt-type conveyor device 12, the belt-type conveyor device 12 must, at least in the region of the free end, be lowered almost to the loading floor 31 of the loading space 21, as illustrated in FIG. 8C. This is achieved for example by virtue of the finger unit 1 of the belt-type conveyor device 12 being curved, proceeding from the straightened position as per FIG. 8B, in the opposite direction to that in FIG. 8A. The finger unit 1 is thus curved not upward but downward. As a result of the targeted curvature of the free end of the belt-type conveyor device 12, a linear height adjustment of the belt-type conveyor device 12 itself is optionally rendered unnecessary. Nevertheless, such a height adjustment is self-evidently possible. Nevertheless, it may be expedient if the belt-type conveyor device 12 can be moved forward and backward, for example in stepped fashion, in order that it can extend as far as necessary into the loading space 21. Therefore, it is basically expedient for the belt-type conveyor device 12 to be in the form of a telescopic belt-type conveyor.

The belt-type conveyor 12 illustrated in FIGS. 8A-C is furthermore equipped with a finger unit 1 which exhibits such flexibility that the piece goods 10, as they are transported along the belt-type conveyor device 12, can effect an auto-adaptive adjustment of the flank elements 2, if the piece goods 10 are heavy enough. Here, the piece goods 10 press the upper flank element 2 downward, such that, owing to the coupling of the flank elements 2, 3 by the webs 6, the free end 5 of the finger unit 1 or of the belt-type conveyor device 12 is curved upward. The corresponding item of piece goods 10 is thus at least partially gripped, and the transportation along the belt-type conveyor device 12 is stabilized.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for conveying piece goods, in particular packages, from a stack and/or pile of piece goods, using a finger unit comprising at least two flexible flank elements which extend jointly from one end of the finger unit to an opposite end of the finger unit, wherein the at least two flexible flank elements are, between the two ends of the finger unit, in each case flexibly connected to one another by way of a multiplicity of webs such that the finger unit is adjustable at least from a curved position into a straightened position and back, wherein the finger unit is pressed against the stack and/or pile of piece goods in a gripping direction such that the at least one flank element is partially impressed by at least one item of piece goods, wherein the finger unit is, as a result of the at least one flank element being impressed in sections, adjusted from a straightened position into a curved position and, in the process, the finger unit, preferably the at least one flank element, at least partially grips the at least one item of piece goods, and wherein the at least one at least partially gripped item of piece goods is moved by the finger unit from the stack and/or pile at least partially in a transport direction pointing perpendicular to the gripping direction.

2. The method according to claim 1, wherein, after the movement of the at least one at least partially gripped item of piece goods from the stack and/or pile, the finger unit is, so as to at least partially grip at least one further item of piece goods of the stack and/or pile, pressed against the at least one further item of piece goods, and wherein the at least one further item of piece goods is moved in the transport direction from the stack and/or pile by the finger unit.

3. The method according to claim 1, in which the at least one at least partially gripped item of piece goods is moved in the transport direction from the stack and/or pile at least partially by way of a movement of the finger unit.

4. The method according to claim 1, in which the at least one at least partially gripped item of piece goods is moved in the transport direction from the stack and/or pile at least partially by way of a movement of a conveyor belt which is provided between the finger unit and the at least one partially gripped item of piece goods.

5. The method according to claim 4, in which a belt-type conveyor device, which comprises the finger unit and the conveyor belt, is used.

6. The method according to claim 1, in which the at least one at least partially gripped item of piece goods is moved in the transport direction from the stack and/or pile at least partially by way of a movement of a transport means, for example in the form of rollers and/or adjustable small hairs, provided between the finger unit and the at least one partially gripped item of piece goods.

7. The method according to claim 1, in which the at least one item of piece goods at least partially gripped by the finger unit is, after the movement from the stack and/or pile, released from the finger unit in the direction of gravitational force by way of an adjustment of the finger unit from a curved position into a straightened position.

8. The method according to claim 1, in which the finger unit, before the pressing against the stack and/or pile of piece goods, is preferably moved over at least parts of the stack and/or pile of piece goods in an approach direction at least partially opposed to the transport direction.

9. The method according to claim 1, in which a belt-type conveyor device is positioned laterally adjacent to the stack and/or pile, and in which the at least one item of piece goods moved in the transport direction from the stack and/or pile by the finger unit is collected by the belt-type conveyor device and is transported away from the stack and/or pile on the conveyor belt of the belt-type conveyor device.

10. The method according to claim 9, in which, as a belt-type conveyor device, use is made of a telescopic belt-type conveyor and/or of a belt-type conveyor device.

11. The method according to claim 9, in which the belt-type conveyor device is adjusted progressively further downward with decreasing height of that region of the stack and/or pile which is adjacent to the belt-type conveyor device.

12. The method according to claim 1, in which the position and/or the contour of the stack and/or pile of piece goods is at least partially captured by a sensor, preferably an optical sensor, in particular a camera, and in which the movement of the finger unit is controlled at least partially in a manner dependent on the position and/or contour of the stack and/or pile of piece goods as captured by the sensor.

13. The method according to claim 12, in which the position and/or the contour of the stack and/or pile is at least partially determined by triangulation.

14. The method according to claim 1, in which a finger unit having at least one pressure sensor, preferably on at least one flank element, is used.

15. The method according to claim 1, in which a multiplicity of mutually adjacently arranged flank elements, which are preferably combined to form a hand unit, are used, and in which, preferably, the multiplicity of flank elements are moved simultaneously, and parallel to one another, in an approach direction, gripping direction and/or transport direction.

16. The method according to claim 1, in which a multiplicity of finger units is distributed substantially over the entire width of the stack and/or pile and/or over the entire width of a loading space which has the stack and/or pile, in particular of a heavy goods vehicle, semitrailer, trailer, container, transport container, interchangeable container and/or rolling container.

17. A method for conveying piece goods, in particular packages, from a stack and/or pile of piece goods, using a belt-type conveyor device, preferably telescopic belt-type conveyor, for conveying piece goods, in particular packages, having a conveyor belt which circulates around a supporting structure, wherein the supporting structure has at least one finger unit which supports the conveyor belt at least in an operating situation, wherein the finger unit has at least two flexible flank elements which extend jointly from one end of the finger unit to an opposite end of the finger unit, wherein the at least two flexible flank elements are, between the two ends of the finger unit, in each case flexibly connected to one another by way of a multiplicity of webs, such that the finger unit is adjustable at least from a curved position into a straightened position and back, wherein the finger unit is provided at a free end of the belt-type conveyor, and wherein at least that end of the at least one finger unit which is assigned to the free end of the belt-type conveyor has a deflection, in particular deflection roller, for deflecting the conveyor belt, wherein the belt-type conveyor device is positioned laterally adjacent to the stack and/or pile of piece goods, wherein piece goods lying on the stack and/or pile are moved from the stack and/or pile onto the conveyor belt of the belt-type conveyor device, and wherein, during the movement of the piece goods from the stack and/or pile, the finger unit is adjusted upward and downward between at least one curved position and one straightened position for the purposes of adjusting the free end of the belt-type conveyor device.

18. The method according to claim 17, in which at least one item of piece goods lying on the stack and/or pile is moved from the stack and/or pile onto the conveyor belt of the belt-type conveyor device by way of a method comprising the steps of:

wherein the finger unit is pressed against the stack and/or pile of piece goods in a gripping direction such that the at least one flank element is partially impressed by at least one item of piece goods, wherein the finger unit is, as a result of the at least one flank element being impressed in sections, adjusted from a straightened position into a curved position and, in the process, the finger unit, preferably the at least one flank element, at least partially grips the at least one item of piece goods, and wherein the at least one at least partially gripped item of piece goods is moved by the finger unit from the stack and/or pile at least partially in a transport direction pointing perpendicular to the gripping direction.

19. The method according to claim 17,
in which the at least two flank elements and the multiplicity of webs are connected to one another and designed such that an impressing of at least one flank element in an impressing direction oblique, in particular perpendicular, to the longitudinal extent of the flank element results in a deflection of the flank element, outside the impressed region, in a direction opposite to the impressing direction.

20. The method according to claim 17,
in which the free end of the belt-type conveyor device is adjusted progressively downward with decreasing height of that region of the stack and/or pile which is adjacent to the belt-type conveyor device.

21. The method according to claim 17,
in which the finger unit is adjusted from a between at least one curved position and one straightened position by way of a drive unit for adjusting the at least two flank elements relative to one another in a longitudinal direction of the finger unit.

22. The method according to claim 17,
in which at least one item of piece goods conveyed by the conveyor belt locally impresses the finger unit, in particular at least one flank element, in such a way that the finger unit, in particular the at least one flank element, is, adjacent to the item of piece goods, deflected upward, in particular in the direction of the item of piece goods.

23. A belt-type conveyor device, preferably telescopic belt-type conveyor, for conveying piece goods, in particular packages, having a conveyor belt which circulates around a supporting structure,
wherein the supporting structure has at least one finger unit which supports the conveyor belt at least in an operating situation, in that the finger unit has at least two flexible flank elements which extend jointly from one end of the finger unit to an opposite end of the finger unit, and in that the at least two flexible flank elements are, between the two ends of the finger unit, in each case flexibly connected to one another by way of a multiplicity of webs, such that the finger unit is adjustable at least from a curved position into a straightened position and back.

24. The belt-type conveyor device according to claim 23, wherein the at least two flank elements and the multiplicity of webs are connected to one another and designed such that an impressing of at least one flank element in an impressing direction oblique, in particular perpendicular, to the longitudinal extent of the flank element results in a deflection of the flank element, outside the impressed region, in a direction opposite to the impressing direction.

25. The belt-type conveyor device according to claim 23, wherein the adjustment of the flank elements from the at least one straightened position into the at least one curved position is performed counter to a restoring force, in particular of the flank elements, and preferably in that the adjustment of the flank elements from the at least one curved position into the at least one straightened position is effected by way of the restoring force.

26. The belt-type conveyor device according to claim 23, wherein the multiplicity of webs and the at least two flank elements form in each case an acute angle, preferably between 5° and 85°, and an obtuse angle, preferably between 95° and 175°.

27. The belt-type conveyor device according to claim 23, wherein the conveyor belt is guided along at least one flank element of the finger unit and is preferably supported by the flank element.

28. The belt-type conveyor device according to claim 27, wherein the conveyor belt is guided along the flank element such that the conveyor belt can press under load against the flank element in order to adjust the finger unit into a curved position.

29. The belt-type conveyor device according to claim 23, wherein at least one end of the at least one finger unit has a deflection, in particular deflection roller, for deflecting the conveyor belt.

30. The belt-type conveyor device according to claim 23, wherein the finger unit is provided at a free end of the belt-type conveyor device.

31. The belt-type conveyor device according to claim 23, wherein the at least two flank elements are, in particular by way of free ends,
connected directly to one another at one end of the at least one finger unit.

32. The belt-type conveyor device according to claim 23, wherein at least one drive unit is provided for adjusting the at least two flank elements relative to one another in a longitudinal direction of the finger unit, preferably with adjustment from at least one straightened position into a curved position and back.

* * * * *